United States Patent [19]

Wen

[11] Patent Number: 4,892,506
[45] Date of Patent: Jan. 9, 1990

[54] SYNERGETIC SPEED-VARIATING MEANS AS ECCENTRICALLY OPERATED

[76] Inventor: Maz Wen, P. O. Box 89-42, Taipei, Taiwan

[21] Appl. No.: 337,325

[22] Filed: Apr. 13, 1989

Related U.S. Application Data

[63] Continuation-in-part of Ser. No. 135,331, Dec. 21, 1987, abandoned.

[51] Int. Cl.⁴ .................... F16H 55/30; B62M 9/08
[52] U.S. Cl. ..................................... 474/49; 280/236
[58] Field of Search ................. 474/49, 50, 52–57; 280/50, 53, 236, 237

[56] References Cited

U.S. PATENT DOCUMENTS

| | | | |
|---|---|---|---|
| 4,309,043 | 1/1982 | Brown | 280/236 |
| 4,493,678 | 1/1985 | Husted | 474/49 |
| 4,598,920 | 7/1986 | Dutil et al. | 280/236 |
| 4,781,663 | 11/1988 | Reswick | 474/49 |

FOREIGN PATENT DOCUMENTS

| | | | |
|---|---|---|---|
| 0822080 | 12/1937 | France | 280/236 |
| 0006767 | of 1902 | United Kingdom | 280/236 |

Primary Examiner—Thuy M. Bui

[57] ABSTRACT

A speed-variating means for bicycle or the like includes a sliding roller carrier means sandwiched between two driving disks of which one driving disk is rotatably coupled with a hub of a bike wheel and the other driving disk is secured with a chain wheel, each driving disk being provided with radial slots engageable with a plurality of sliding rollers of the roller carrier means, whereby a driving of a bike chain, a first speed variating ratio can be effected between the chain-wheel-secured driving disk and the sandwiched roller carrier means and a second speed variating ratio can be effected between the hub-coupled driving disk and the sandwiched roller carrier means, thereby obtaining a synergetic speed-variating effect by multiplying the first and the second speed variating ratio by means of such a compact mechanism of the sandwiched roller carrier means.

8 Claims, 4 Drawing Sheets

SYNERGETIC SPEED-VARIATING MEANS AS ECCENTRICALLY OPERATED

BACKGROUND OF THE INVENTION

This application is a continuation-in-part of an original application entitled "Eccentrically Operating Speed-variating Means for Bicycle" filed on Dec. 21, 1987 with a Ser. No. 07/135,331 by the present applicant now abandoned.

Original application disclosed a speed variating means comprised of a driving disk, a sliding roller carrier means eccentrically moving in the disk, a chain wheel driving the roller carrier means and a variable speed adjusting means, which however can only be operated for speed variation by eccentrically moving the chain wheel and the roller carrier means in a single driving disk so that the speed variating ratio is still quite limited.

Original application also disclosed a sliding block 23 formed with a sliding roller 24 thereon and a wedge portion 25 tapered rearwardly for slidingly loading a plurality of clutching rollers 26 thereon as shown in original FIG. 6, which however may easily cause wearing of the plural rollers 26 having different diameters with one another, or may cause heterogeneous stress distribution on an annular groove of the roller means 2 to easily damage the eccentric mechanism since the rollers 26 are all loaded on a single wedge portion, rather than two wedge portions symmetrically disposed on two opposite sides of the sliding block.

The present inventor has found the defects of the original application and invented the present speed variating means which can be synergetically effected by a roller means sandwiched between two driving disks.

SUMMARY OF THE INVENTION

The object of the present invention is to provide a speed-variating means for bicycle or the like having a sliding roller carrier means sandwiched between two driving disks of which one driving disk is rotatably coupled with a hub of a bike wheel and the other driving disk is secured with a chain wheel, such driving disk being provided with radial slots engageable with a plurality of sliding rollers of the roller carrier means, whereby upon a driving of a bike chain, a first speed variating ratio can be effected between the chain-wheel-secured driving disk and the sandwiched roller carrier means and a second speed variating ratio can be effected between the hub-coupled driving disk and the sandwiched roller carrier means, thereby obtaining a synergetic speed-variating effect by multiplying the first and the second speed variating ratio by means of such a compact mechanism of the sandwiched roller carrier means.

DETAILED DESCRIPTION

Figure 1:
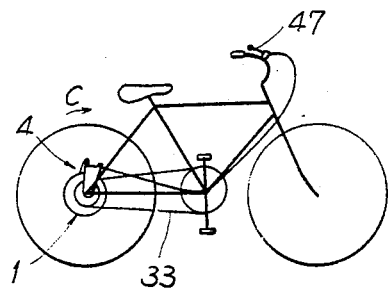
FIG. 1 shows a bike in accordance with the present invention.

As shown in FIGS. 1-4, the present invention comprises: an outer driving disk 1a secured with a chain wheel 3, an inner driving disk 1 rotatably engageable with a hub 52 of a bike rear wheel 5, a central sliding-roller carrier means 2 sandwiched between the two driving disks 1a, 1, and a variable speed adjusting means 4.

Figure 3:
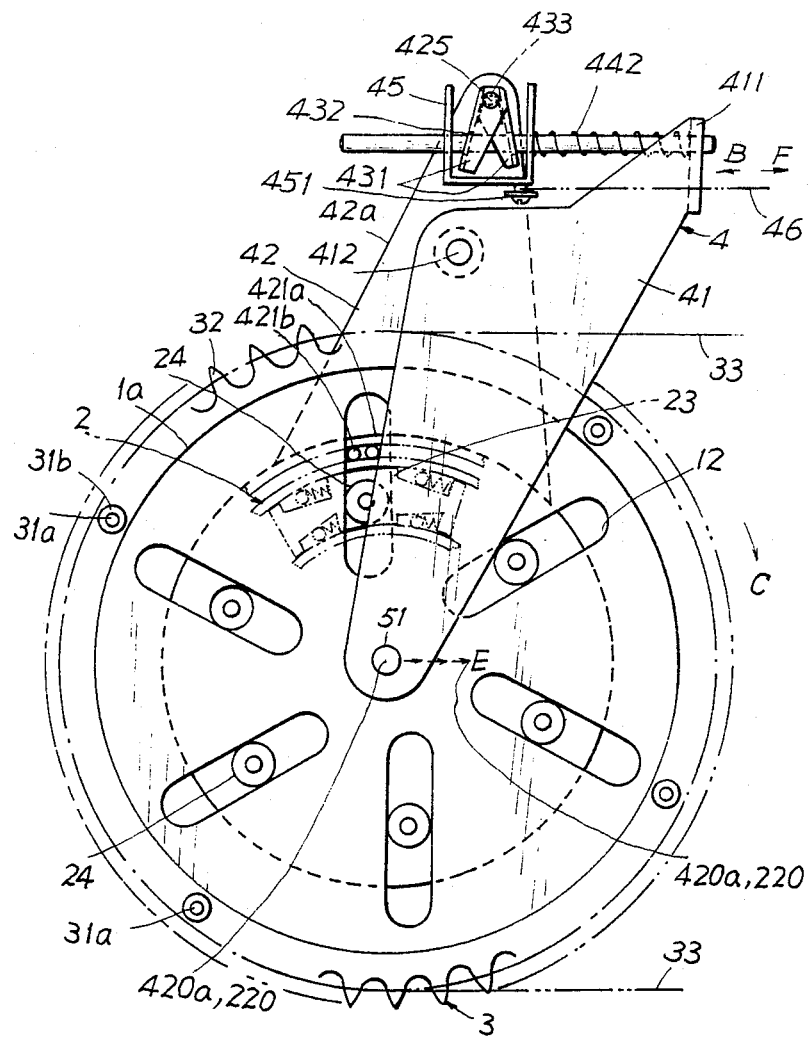
FIG. 3 is an illustration of a front elevation of the present invention as viewed from direction A of FIG. 2.

The outer driving disk 1a is generally formed as a circular disk having a central hole provided with bearings 11a rotatably mounted on an axle 51 of a rear bike wheel 5 and formed with a plurality of radial slots 12 each slightly inclined from a corresponding radius of the disk 1 to form an approximate spiral shape as shown in FIG. 3, an outer flange 10 secured with the chain wheel 3 having gear 32 driven by a chain 33. The chain wheel 3 is secured to the disk 1 by a plurality of sticks 31a each stick 31a being jacketed with an elastomer packing 31b for absorbing a vibrational shock caused during operation or running of a bike, between the disk 1a and the chain wheel 3.

Figure 7:
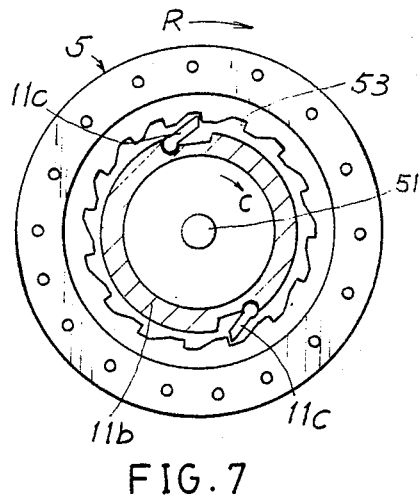
FIG. 7 shows an engagement between a driving disk and a bike hub in accordance with the present invention.

The inner driving disk 1 is also formed as a circular disk corresponding to the outer disk 1a having a central annular extension 11b with two pawls 11c engageable with annular ratchet teeth 53 formed in a hub 52 of the rear bike wheel 5, and formed with a plurality of radial slots 12 in the disk 1. Once the variating means of the present invention is out of order, the rear wheel 5 can still keep running in direction C as shown in FIG. 7. In normal bike running by treadling bike pedals, the chain wheel 3 is rotated to drive the outer disk 1a, the roller carrier means 2 and the inner disk 1 in which the pawls 11c of the annular extension 11b engage the ratchet teeth 53 of the rear wheel 5 so that upon a rotation of the chain wheel 3 and disk 1 in direction C, the rear wheel 5 can be driven accordingly as shown in FIG. 7.

The central sliding roller means 2 is formed as a collar having an outermost perimeter 21 rotatably held in a circular disk 421a of the variable speed adjusting means 4, a central opening 22c longitudinally formed through the collar, two annular grooves 22a, 22 respectively recessed in two opposite side portions of the collar each groove 22a or 22 defined between the outermost perimeter 21 and the central opening 22c, and a plurality of sliding blocks 23 slidably engageable in either groove 22a or 22.

Figure 4:
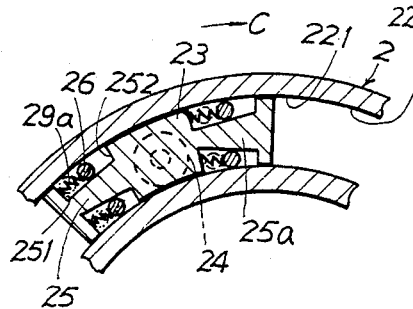
FIG. 4 shows a sliding block of the present invention.
Figure 2:
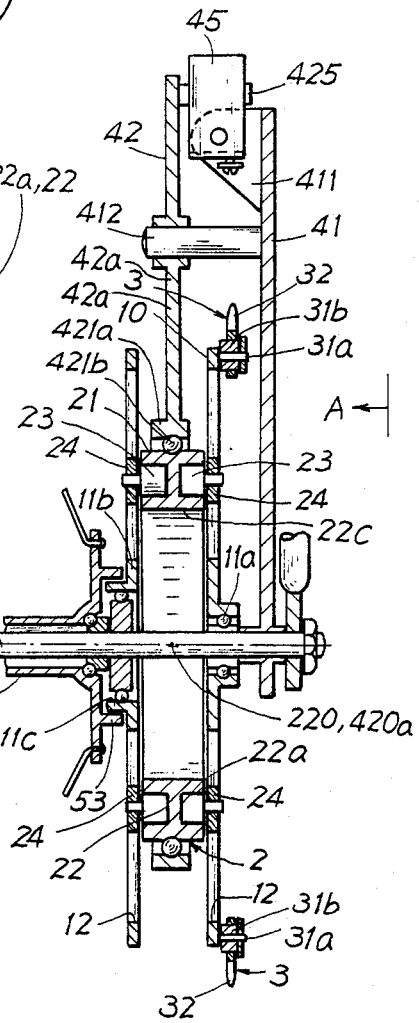
FIG. 2 is a side-view sectional drawing of the present invention.

Each sliding block 23 as shown in FIG. 4 includes: a sliding roller 24 protruding outwardly to be engageable with each slot 12 formed in either disk 1a, 1, at least a pair of wedge portions 25, 25a each tapered rearwardly and both disposed on a rear and a front side of the block 23, and at least two pairs of clutching rollers 26 each pair of rollers 26 operatively moving on the two wedge portions 25, 25a.

Each wedge portion 25 or 25a is tapered rearwardly or counter-clockwise (if the carrier means is rotated clockwise) to form a pair of acute-angle portion 251 at its tapered side and a pair of obtuse-angle portions 252 at an opposite side to the tapered side. Each roller 26 is retained on a rear end acute-angle portion 251 by a tension spring 29a. Such a tension spring 29a normally urges the tapered wedge portion 25 towards the obtuse-angle portion 252 to frictionally couple the wedge portion of the block 23 with an annular groove wall 221 so that upon a clockwise rotation of the roller means 2 as driven by a chain wheel rotating clockwise C, the sliding blocks 23 as coupled to the outer disk 1a will be frictionally coupled to the roller means 2 to thereby rotate the roller means 2 within a bearing 421b of the circular disk 421a of the variable speed adjusting means 4. The inner disk 1 having the slots 12 engageable with the rollers 24 of the sliding blocks as held in a left side of the roller means 2 will also be rotatably driven by the roller means 2 since the blocks 23 will also be frictionally coupled with the roller means 2 clockwise rotated C as aforementioned. Therefore, the chain wheel 3 disposed at the right side of the roller means 2 may finally drive the inner disk 1 and the bike hub 52 for driving the bike wheel 5.

Figure 8:
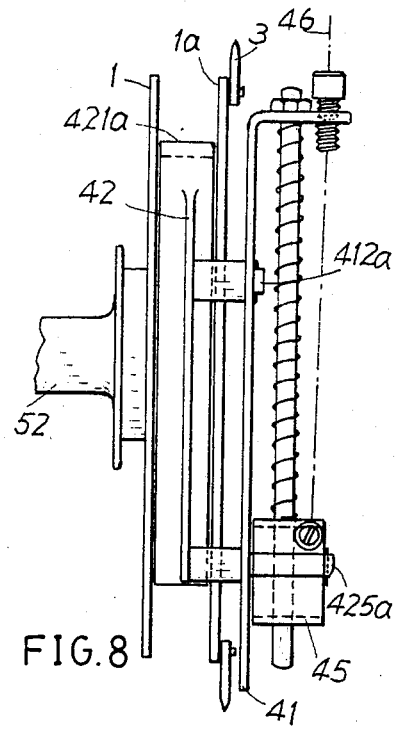
FIG. 8 shows another preferred embodiment of the present invention.

In view of FIGS. 20 and 8 of originally filed drawings whereon this application is based, all sliding locks 23 are normally coupled with the carrier means 2, with only one roller 24 having a shortest distance from the axle 51 which may drive the disk 1 for rotating the disk 1 and bike wheel forwardly, but having the remaining rollers released without driving the disk 1 (as shown on Page 9, Lines 10–14 of original specification as early filed). By such a principle, the present continuation in part application may occur speed variation on a right side and a left side of the sandwiched roller means 2.

The variable speed adjusting means 4 includes: a fixing plate 41 having its central portion secured to the axle 51 of rear wheel 5, an eccentric plate 42 having a circular disk 421a formed with an annular bearing 421b for rotatably mounting the perimeter 21 of the roller means 2 therein and a biasing plate 42a pivotally mounted on the fixing plate 41 by a fulcrum pin 412 formed on the plate 41, a calliper retainer having two calliper arms 431 pivotally mounted on a driving pin 425 formed on an upper end of the biasing plate 42a of which each arm 431 is formed with a rod hole 432 passing through a guiding rod 44 secured to a bracket 411 of the fixing plate 41 and the two arms 431 are resiliently locked on the rod 44 when extended by a calliper tensioning spring 433 tensioning the two arms 431 to be normally open, an U-shaped pusher member 45 slidably mounted on the rod 44 and normally disposed around the calliper retainer 43 by a restoring spring 442 jacketed on the rod 44 between the pusher member 45 and the bracket 411, and an actuating wire 46 having its rear end fixed on the pusher member by a screw 451 and having its front end secured to an operating lever 47 secured on a handle bar of a bike.

Figure 5:
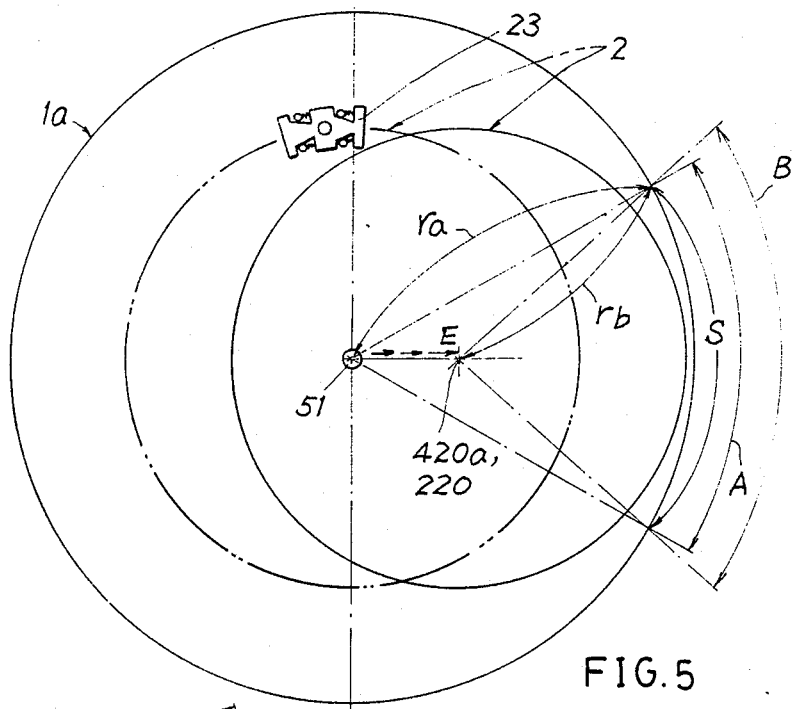
FIG. 5 is an illustration showing a first speed variation of the present invention.
Figure 6:
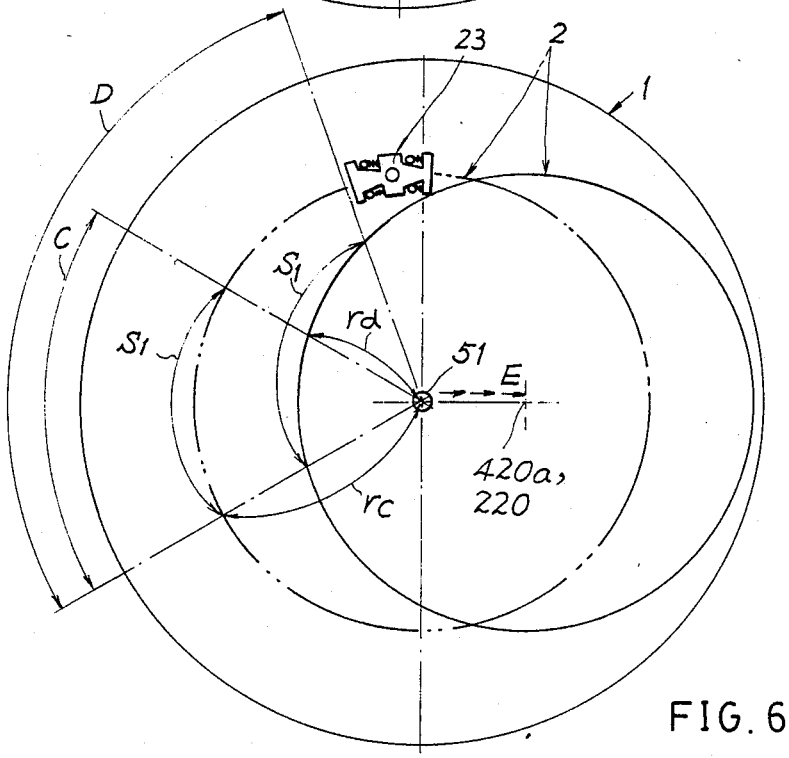
FIG. 6 is an illustration showing a second speed variation of the present invention.

When allowing the restoring spring 442 to urge the pusher member 45 leftwardly (direction B) to bias the eccentric plate 42 frontwardly (direction E) as shown in FIG. 3, an axis 420a of the circular disk 421a of the eccentric plate 42 and an axis 220 of the roller means 2 being concentric to axis 420a will be eccentrically moved frontwardly, thereby obtaining a first speed variation (acceleration) formed on a right side of the sandwiched roller means 2 as shown in FIG. 5, and a second speed variation (acceleration) formed on a left side of the roller means 2 as shown in FIG. 6. When pulling wire 46 in direction F, a slower speed can be adjusted.

In FIG. 5, if a chain 33 is driven having a stroke s along the chain wheel 3, a first speed variation R1 can be obtained by the following formula:

$$R1 = \frac{S/2 \, \pi rb}{S/2 \, \pi ra} = \frac{ra}{rb} = \frac{B}{A}$$

wherein B is a rotating angle after being eccentrically moved from original angle A, ra is original radius, and rb is eccentric radius, thereby accelerating the bike speed.

As shown in FIG. 6, the stroke S1 of chain wheel 3 may result in a second speed variation R2 as follows:

$$R2 = \frac{S1/2 \, \pi rd}{S1/2 \, \pi rc} = \frac{rc}{rd} = \frac{D}{C}$$

wherein D is an eccentric rotating angle as eccentrically moved from original C angle, rd an eccentric radius and rc original radius, thereby further accelerating the bike speed.

Since angle C=A, the total speed variating ratio RT may be obtained:

$$RT = R1 \times R2$$
$$= \frac{B}{A} \times \frac{D}{C} = \frac{BD}{A^2}$$

Accordingly, this application may obtain a synergetic speed variation effect, much greater than original application.

The sliding block 23 having two wedge portions 25 disposed on two opposite sides of the block so that the stress of the moving block is uniformly distributed onto the groove wall 221 of the roller means 2 to cause a stable sliding of blocks in the groove 22a, 22 or to soothe the pressure acting on the groove to prevent wearing of the relevant moving parts of the eccentric mechanism. So, the block 23 with two wedge portions 25 is much improved over the block 23 with single wedge portion 25 as originally filed.

Figure 9:
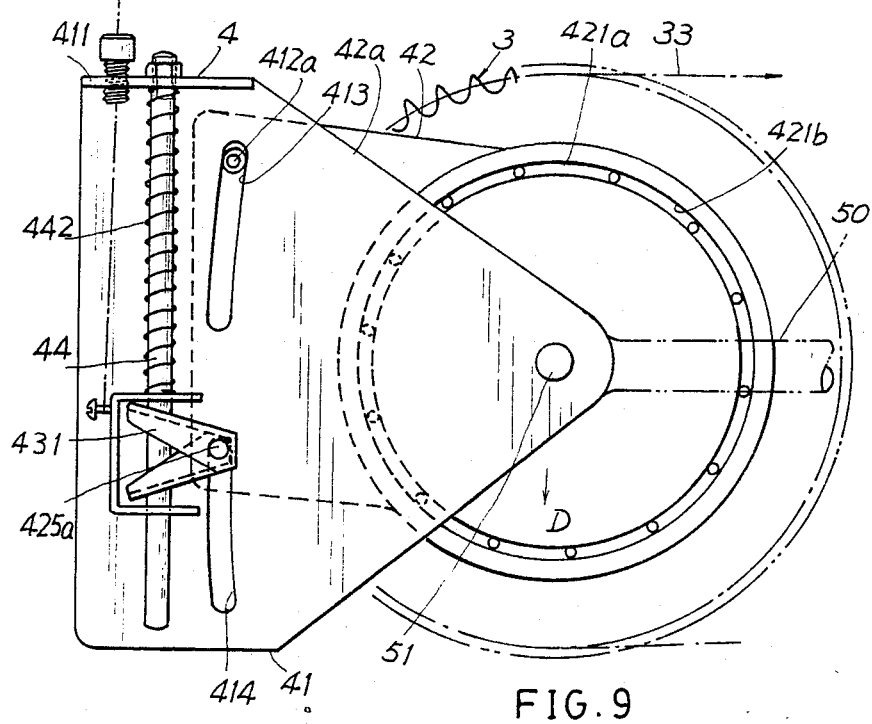
FIG. 9 is a side view of the present invention as viewed from FIG. 8.

As shown in FIGS. 8, 9, the variable speed adjusting means 4 may be modified to include a fixing plate 41 formed with two guiding slots 413, 414 generally vertically aligned to be perpendicular to a horizontal tube 50 of a bike frame secured with the axle 51, a fulcrum pin 412a fixed on an upper portion of the biasing plate 42a and slidably moving in an upper guiding slot 413, a driving pin 425a fixed on a lower portion of the biasing plate 42a slidably moving in a lower guiding slot 414 formed under the upper slot 413, and the guiding rod 44 for mounting the pusher member 45 vertically secured on the fixing plate 41.

When adjusting the speed, the wire 46 is loosened to allow the spring 442 urging the pusher member 45 downwardly so that the eccentric plate 42, and the roller means 2 is downwardly moved ( direction D as shown in FIG. 8 for eccentric adjustment to increase a bike speed. While the situation of the present invention is shown in FIG. 8, the chain wheel 3, the roller means 2 and the circular disk 421a are commonly concentric for normal-speed running of the bike.

The mechanism of the variable speed means 4 as shown in FIGS. 8, 9 can be applied to the original application of which the original filed specification and drawings (FIGS. 10, 11) discloses a plurality of coupling rollers 421 which are equivalent to the bearing 421b in the circular disk 421a of the eccentric plate 42 as shown in the present continuation-in-part application.

I claim:

1. A speed variating means for bicycle or like comprising:
   an outer driving disk having a central portion rotatably mounted on axle of a rear bike wheel, a plurality of radial slots formed in the disk each slightly inclined from a corresponding radius of the slot to form an approximate spiral shape of all the slots, and having an outer flange secured with a chain wheel driven by a bike chain;
   an inner driving disk corresponding to said outer driving disk having a central annular extension rotatably engageable with a hub of the rear bike wheel, a plurality of radial slots formed in the inner driving disk each slightly inclined from a corresponding radius of each slot to form an approximate spiral shape;
   a central sliding-roller carrier means sandwiched between said outer driving disk and said inner driving disk having a plurality of sliding block rotatably engageable in a first annular groove formed in a right side portion of said sliding-roller carrier means each sliding block having a roller protruding outwardly to be slidably engaged with each radial slot formed in said outer driving disk, and having a plurality of sliding blocks rotatably engageable in a second annular groove formed in a left side portion of said inner disk each sliding block having a roller protruding outwardly to engage each radial slot formed in said inner driving disk, each said sliding block having means for operatively coupling said block with said annular groove of said sliding-roller carrier means when forwardly driving said chain wheel and said outer driving disk; and
   a variable speed-adjusting means having a fixing plate secured to an axle of the rear bike wheel, and an eccentric plate having a circular disk rotatably mounting said sliding-roller carrier means therein, said eccentric plate being operatively biased to eccentrically move said sliding-roller means with respect to said two driving disks, thereby obtaining a synergetic overall speed variation by multiplying a first speed variation exerting between said outer driving disk and said central sliding-roller carrier means, and a second speed variation exerting between said inner driving disk and said central sliding-roller carrier means.

2. A speed variating means for bicycle according to claim 1, wherein said sliding block includes at least two wedge portions formed on a front side portion and a rear side portion of said sliding block, having means for operatively coupling said block with said annular groove of said sliding-roller carrier means.

3. A speed variating means for bicycle according to claim 2, wherein said means for coupling said block with said annular groove of said sliding-roller carrier means includes two pairs of clutching rollers each pair of clutching rollers operatively moving on a wedge portion, said wedge portion tapered rearwardly opposite to a chain-wheel driving direction to form a pair of acute-angle portions at its tapered side and a pair of obtuse-angle portions at a side opposite to said tapered side, each said clutching roller secured to said acute-angle portion by a tension spring normally urging said clutching roller to frictionally couple said wedge portion of said sliding block with said annular groove of said sliding-roller carrier means.

4. A speed variating means for bicycle according to claim 1, wherein said inner driving disk has said annular extension formed with at least a pawl operatively engageable with an annular ratchet teeth formed in said hub of said rear bike wheel, when forwardly rotated as driven by said chain wheel, and disengageable from the ratchet teeth when reversely rotated.

5. A speed variating means for bicycle according to claim 1, wherein said sliding-roller carrier means includes an outermost perimeter rotatably mounted in a circular disk of said eccentric plate of said variable speed adjusting means, and a central opening, each said annular groove for engaging said sliding blocks being defined between said outermost perimeter and said central opening.

6. A speed variating means for bicycle according to claim 1, wherein said variable speed adjusting means includes said eccentric plate having said circular disk rotatably engageable with said sliding-roller carrier means and a biasing plate secured with said circular disk pivotally secured to a fulcrum pin formed on said fixing plate of said variable speed adjusting means, and means for pulling or releasing said biasing plate in order to eccentrically move said sliding-roller carrier means for speed variation of a bike.

7. A speed variating means for bicycle according to claim 1, wherein said variable speed adjusting means includes said fixing plate formed with guiding means thereon, an eccentric plate having a biasing plate secured with a circular disk rotatably mounting said sliding-roller carrier means in said circular disk, and said biasing plate having means to be adjustably moved in said guiding means of said fixing plate for a bike speed variation.

8. A speed variating means for bicycle according to claim 1, wherein said outer driving disk as secured with said chain wheel is provided with an elastomer packing for absorbing vibrational shock between said chain wheel and said driving disk.

* * * * *